United States Patent
Froehlich et al.

(10) Patent No.: US 10,060,784 B2
(45) Date of Patent: Aug. 28, 2018

(54) BALANCE HAVING A LOAD CHANGING DEVICE AND METHOD FOR OPERATING SAID BALANCE

(71) Applicant: SARTORIUS LAB INSTRUMENTS GMBH & CO. KG, Goettingen (DE)

(72) Inventors: Thomas Froehlich, Illmenau (DE); Sigo Muehlich, Bovenden (DE); Falko Hilbrunner, Ilmenau (DE); Thomas Fehling, Witzenhausen (DE); Mario Schreiber, Goesen (DE)

(73) Assignee: Sartorius Lab Instruments GmbH & Co. KG, Goettingen (DE)

( * ) Notice: Subject to any disclaimer, the term of this patent is extended or adjusted under 35 U.S.C. 154(b) by 0 days.

(21) Appl. No.: 15/717,418

(22) Filed: Sep. 27, 2017

(65) Prior Publication Data

US 2018/0017432 A1    Jan. 18, 2018

Related U.S. Application Data

(63) Continuation of application No. PCT/EP2016/000355, filed on Mar. 2, 2016.

(30) Foreign Application Priority Data

Mar. 27, 2015 (DE) .......................... 10 2015 104 693

(51) Int. Cl.
    *G01G 21/23* (2006.01)
(52) U.S. Cl.
    CPC .................... *G01G 21/23* (2013.01)
(58) Field of Classification Search
    CPC .................... G01G 11/00–11/20; G01G 21/23
    See application file for complete search history.

(56) References Cited

U.S. PATENT DOCUMENTS 3,955,665 A * 5/1976 Pettis, Jr. ............... G01G 15/00
                                                  177/145
7,222,715 B2 * 5/2007 Madden .................... B07C 5/36
                                                  177/145

(Continued)

FOREIGN PATENT DOCUMENTS

| DE | 4023483 A1 | 2/1991 |
| DE | 29607731 U1 | 8/1996 |
| DE | 102005005366 A1 | 8/2006 |

OTHER PUBLICATIONS

International Search Report and Written Opinion in counterpart International Application No. PCT/EP2016/000355, dated May 12, 2016.

(Continued)

*Primary Examiner* — Natalie Huls
(74) *Attorney, Agent, or Firm* — Edell, Shapiro & Finnan, LLC

(57) ABSTRACT

A balance with a load changing device (14) that has a magazine table, mounted to be horizontally movable and having a plurality of vertical openings (26) arranged in groups. The balance (12) has a load cell (34) and a load receptor (42) with a carrier arrangement (44) corresponding to each of the groups of openings. The magazine table and the balance are height adjustable relative to each other. In a weighing position, a group of openings above the load receptor is penetrated by the carrier arrangement. In a changing position, the carrier arrangement is positioned lower than the openings in the magazine table. The magazine table is mounted at a fixed height relative to a base (16), and the balance is height adjustable relative to the base. The travel of the balance is upwardly limited by a stop (32), which is at a fixed height relative to the base.

10 Claims, 1 Drawing Sheet

(56) References Cited

U.S. PATENT DOCUMENTS

| | | | | |
|---|---|---|---|---|
| 7,596,984 B2* | 10/2009 | Genoud | ............... | G01G 23/012 |
| | | | | 177/1 |
| 7,834,279 B2* | 11/2010 | Macmichael | .......... | G01G 21/30 |
| | | | | 177/238 |
| 8,178,799 B2* | 5/2012 | Luchinger | ................. | B01L 9/06 |
| | | | | 177/145 |
| 8,716,608 B2* | 5/2014 | Karlsson | ............... | G01G 15/00 |
| | | | | 177/1 |
| 9,310,241 B2* | 4/2016 | Farlotti | ............... | G01G 19/005 |
| 9,612,149 B2* | 4/2017 | Burkhard | ............. | G01G 19/414 |
| 9,726,534 B2* | 8/2017 | Gempp | ................. | G01G 19/03 |

OTHER PUBLICATIONS

International Preliminary Report on Patentability and Written Opinion in counterpart International Application No. PCT/EP2016/000355, dated May 12, 2016, with English abstract.

* cited by examiner

BALANCE HAVING A LOAD CHANGING DEVICE AND METHOD FOR OPERATING SAID BALANCE

CROSS REFERENCE TO RELATED APPLICATIONS

This is a Continuation of International Application PCT/EP2016/000355, which has an international filing date of Mar. 2, 2016, and the disclosure of which is incorporated in its entirety into the present Continuation by reference. The following disclosure is also based on and claims the benefit of and priority under 35 U.S.C. § 119(a) to German Patent Application No. DE 10 2015 104 693.8, filed Mar. 27, 2015, which is also incorporated in its entirety into the present Continuation by reference.

FIELD OF THE INVENTION

The invention relates to a balance with a load changing device, wherein the load changing device has a magazine table, which is mounted so as to be horizontally movable, and has a plurality of vertical openings arranged in groups; and the balance has a load cell and a load receptor having a carrier arrangement, corresponding to each group of openings in the magazine table; and wherein the magazine table and the balance are height adjustable relative to each other, so that in a weighing position a group of openings, which are positioned above the load receptor, in the magazine table is penetrated by the carrier arrangement of the load receptor; and in a changing position the carrier arrangement of the load receptor is positioned lower than the vertical openings in the magazine table.

Furthermore, the invention relates to a method for operating such a device.

BACKGROUND

Generic balances with a load changing device are disclosed in DE 296 07 731 U1 as part of the prior art that is discussed in said patent. This published document discloses comparator balances that have the primary task of determining in succession a weight value for a plurality of test weights and of comparing said weight value with a weight value of a reference weight that is determined accordingly. In this case it is not the determination of the absolute mass of the test weights that matters, but rather only the difference with respect to the absolute mass of the reference weight. The present invention also relates primarily to comparator balances, but can also be readily employed in common weighing devices, in which the determination of the absolute mass is of primary importance.

The German patent DE 40 23 483 A1 discloses a device for determining the dry substance content; and this device can accommodate a plurality of sample vessels with a turntable, which functions as a load changing device, and can place said sample vessels on the weighing pan of a balance in interaction with a lifting device.

The balance of the known device comprises a load cell, consisting of a mechanical weighing system and an appropriate electronic control unit, usually integrated into a housing, and a top-pan load receptor, which is coupled to a load introducing element of the weighing system. Above the balance there is a turntable, which is used in essence as a test weight magazine. The test weights are placed on said turntable, distributed over its periphery, at predetermined positions, so that by rotating the turntable said test weights can be moved into a position exactly above the load receptor of the balance. In addition to its rotary mobility, the turntable is height adjustable with respect to a common base of both the turntable and the balance. By lowering the turntable, the test weight, positioned above the load receptor, can be lowered onto the load receptor. In this case a finger-like carrier arrangement of the load receptor extends through the corresponding vertical openings in the turntable and, when the turntable is lowered even further, supports the test weight against the force of gravity. As a result, the load of the test weight rests on the load receptor and can be coupled into the weighing system with the load introducing element, so that the balance can determine a weight value for a test weight. The special design of the carrier arrangement of the load receptor and the vertical openings in the turntable is not disclosed in the cited document. However, the person skilled in the art knows about a number of configurations that can also be used in the context of the present invention. Thus, the carrier receptacle and the vertical openings may be formed, for example, in the shape of horizontally oriented forks with intermittent tines. It is also possible for the carrier arrangement to have vertically directed supporting fingers, which extend through the enclosed holes in the turntable.

The drawback with the known device is the enormous amount of effort that would have to be devoted to supporting the turntable. In order to be able to repeat the positioning of the test weights with a high degree of accuracy, it is necessary to minimize any and all backlash of the turntable, in particular, a tilt backlash. At the same time, however, the turntable has to be able to move not only rotationally, but also linearly in the vertical direction with minimal friction. In this case the task of achieving a backlash that is as near zero as possible while at the same time retaining low-friction mobility in two directions of motion involves extremely high requirements in terms of bearing engineering, an aspect that is reflected in the high cost of the device.

A precise and repeatable positioning of the test weights is necessary for a variety of reasons. From a metrological point of view an exact positioning is required to observe the required uncertainties when determining the mass. Off-center loading of the weighing system leads to so-called off-center load errors. Although these off-center load errors can be reduced through special additional modules for automatic centering of the test weights, even in this case a repeatable positioning with the load changer is a necessary prerequisite for mass comparisons having a low degree of measurement uncertainty.

However, an exact positioning of the test weights is also necessary for reasons relating to the handling of the weights. If the test weights are not transferred, for example, parallel to the weighing pan due to the poor alignment or backlash in the guides of the load changer, then the test weights may show signs of wear and lateral creep.

SUMMARY

One object of the present invention is to further develop such a device with reduced requirements for the turntable bearing arrangement. It is a further object to improve the precision of the test weight positioning.

According to one formulation, this engineering object is achieved by mounting the magazine table at a fixed height relative to a base, and configuring the balance to be height adjustable relative to the base, wherein the travel of the balance is upwardly limited by a stop that is at a fixed height relative to the base.

Also disclosed are exemplary embodiments of the invention as well as various inventive methods for operating a balance device.

In principle, the magazine table can be designed in different ways. In a first variant of the invention, it is provided that the magazine table is designed as a sliding stage, which is mounted horizontally in a linearly moveable manner and has a surface, over which the groups of openings are arranged so as to be distributed. Preferably, however, the magazine table is designed as a turntable, which is mounted horizontally in a rotatable manner, and the groups of openings are arranged so as to be distributed over the periphery of said turntable. This variant is the subject matter of the following explanations, and those skilled in the art can also easily apply them mutatis mutandis to the sliding stage variant.

In one aspect, the present invention partially reverses the kinematics of the prior art. In particular, the relative motion of the balance and the turntable is moved in the vertical direction from the turntable (prior art) to the balance (invention). However, the relative rotary motion of the balance and the turntable remains assigned to just the turntable alone. Therefore, when seen from a common base, the turntable is no longer lowered down to the turntable in order to transfer a test weight from the turntable to the load receptor, but rather the balance is raised up to the turntable. The result of this arrangement is a first simplification of the bearing technology, because only a simple bearing arrangement, i.e., a bearing arrangement that allows a movement with only one motion component, is required for each of the two elements that can be moved relative to the base. Simple bearing arrangements of this type can be fabricated with a much higher degree of precision with significantly less effort than complex bearing arrangements, i.e., bearing arrangements that permit movements with a plurality of motion components. Therefore, instead of a bearing arrangement with two degrees of freedom, the invention requires two bearings, each having one degree of freedom.

According to yet another aspect of the invention, accuracy of the system is further improved by moving the height adjustable balance against a stop, so that due to the non-positive engagement between the stop, which is at a fixed height relative to the base, and a counter-stop, which is at a fixed height relative to the balance, the backlash of the balance (height) adjustment is completely suppressed. Hence, the only unsuppressed backlash of the inventive device is in the rotary bearing arrangement of the turntable, and in this case those skilled in the art know a number of solutions for a near zero backlash turntable bearing arrangement or, more generally, a magazine table bearing arrangement. For example, precision ball bearings, precision needle bearings or precision cone bearings, precision sliding bearings or the like may be used in this case. In order to achieve zero backlash, the use of spring-loaded precision bearings is also possible in this context and in many cases even highly preferred. In this respect it is particularly advantageous not to use statically overdetermined bearing systems, but rather to use statically determined 3 point bearings.

Where exactly the stop that is at a fixed height relative to the base is located, is largely irrelevant for the invention. It is conceivable that the arrangement is on a frame that supports the turntable and that is fixed on a base, which is also used to adjust the height of the balance as a base. As an alternative, it goes without saying that it is also possible to provide a dedicated stop frame on said base. In any case the stop is conveniently designed as a three point stop, which ensures that the system always exhibits zero tilt. Special preference is given to an embodiment of the stop in the so-called cone/cut/plate form, in which a first pair of stop elements is formed as a cone/hollow cone pair; a second pair of stop elements as a cut/hollow groove pair; and a third pair of stop elements as a plate/mandrel or plate/ball pair. The exact design and arrangement of the counter-stop is largely irrelevant for the invention. As a result, it is conceivable, for example, to dispose it directly on the housing of the load cell. However, as an alternative, it is also possible to dispose the load cell on a type of lifting platform and to fix the counter-stop on the lifting platform. The person skilled in the art will understand that the stop and the counter-stop have to match each other in their shape and position.

It can be provided that the stop or the counter-stop has a force-measuring device, preferably at one of the pairs of stop elements, even more preferably, at the plate/mandrel pair or the plate/ball pair. This arrangement makes it possible to determine the force with which the counter-stop is pressed against the stop. This feature is particularly important for an accurate and repeatable height adjustment of the balance. In any case it is required that the lifting mechanism of the balance be able to generate a force that is greater than the sum of the forces of the weight (including the test weight) resting on the height adjustment of the balance. This means that only then would it be possible to consider any backlash of the height adjustment in the weighing position as being reliably suppressed. On the other hand, it is advantageous for reasons relating to an economic design of the system to keep any forces that may occur as low as possible. Therefore, it would suffice if in the weighing position, i.e., with the balance and, placed on it, the weight located in the raised position, a slight contact pressure were applied between the stop and the counter-stop. Special preference is given to this feature, regardless of the size of the deposited weight. This feature will be explained in greater detail below.

Of course, it is possible to perform the height adjustment of the balance by hand. However, with regard to a high degree of automation of the system it is preferred that the balance be disposed on a first motorized lifting device or be provided with such a device. In this respect the lifting platform arrangement, described above, falls under the first option; and the second option relates to a lifting device that is integrated with the load cell itself.

The first motorized lifting device is provided preferably with a force-controlled cut-off. In this context the term "cut-off" is to be construed in the broad sense and is intended to describe the transfer into a state in which the lifting device does not provide any additional mechanical feed, but at the same time keeps the contact pressure that is achieved between the counter-stop and the stop more or less constant. With such a force-controlled cut-off it is possible to automatically adjust the aforementioned optimum contact pressure (sufficiently large to reliably suppress any backlash, at the same time small enough to protect the bearing, etc. and not to consume unnecessary energy) in a repeatable manner. If a cut-off is always performed at the same contact pressure, irrespective of the size of the deposited weight, then this feature also increases the reliability of the measurement results, since the same force-induced warping, buckling etc. of the entire mechanical system always occur.

With respect to the greatest possible degree of automation of the inventive system, the turntable is also provided preferably with a motorized drive. In this case a preferred embodiment may be a motorized, centered drive, in particular, a belt drive owing to its zero backlash. As an alternative, the turntable may also be provided with a motorized peripheral drive, which is designed preferably not as a meshing drive, but rather as a friction drive owing to its zero backlash. The particular advantage of the peripheral drive lies in the fact that the central area below the turntable can be left free, so that a larger space is available for the balance and the lifting device. If, however, the minimization of the outer dimensions of the device of the invention is of particular interest, then a centered drive may be advantageous.

As explained above, the basic principle of the invention consists of the feature that the balance is moved with its load receptor from below against the test weight and, in so doing, raises said test weight from its position on the turntable. In the worst case this situation can lead to comparatively hard "blows" delivered to the sensitive weighing system of the load cell. This danger exists especially if a large number of test weights are to be weighed in the shortest possible sequence. This requires, in particular, a relatively fast lifting motion of the balance and, in so doing, causes correspondingly hard "blows" during the transfer of the test weights. In order to remedy this situation, it is provided in an advantageous further development of the invention that the load receptor is height adjustable with respect to the load cell with a second motorized lifting device, and in this case said load receptor is decoupled from the weighing system of the load cell in a raised position and is coupled with the weighing system of the load cell in a lowered position. If the transfer of the test weight occurs when the load receptor is decoupled from the weighing system, then the resulting "blow" is dissipated by way of the second lifting device to the housing of the load cell. At the same time the sensitive weighing system is bypassed. Not until thereafter is the second lifting device lowered and the coupling of the load receptor to the load introducing element of the weighing system is completed. As a result, the comparatively long travel of the balance with the first lifting device can be executed at a relatively high speed, whereas the short travel of the load receptor with the second lifting device can be carried out slowly without any significant loss of time; as a result, the coupling of the load receptor to the weighing system can be carried out gently. The net result is a significant increase in the measurement certainty as compared to systems with only one, i.e., the first lifting device.

Preferred aspects of a method for operating a device of the invention have already become apparent from the previous explanations. Nevertheless, a method, comprising:

moving the magazine table, in particular, rotating the turntable, until a selected test weight is positioned above the load receptor of the balance that is located in a changing position, raising the balance until the carrier arrangement extends through the group of openings, associated with the test weight, and the carrier arrangement abuts the test weight, further raising the balance together with the test weight, resting on the carrier arrangement of its load receptor, until the stop abuts a counter-stop, which is fixed at a fixed height relative to the balance, determining a weight value for the test weight and lowering the balance into the changing position, constitutes an independent invention.

In the case of an embodiment of the inventive device with two lifting devices, the optimum operating method comprises preferably:

moving the magazine table, in particular, rotating the turntable, until a selected test weight is positioned above the load receptor of the balance that is located in a changing position, with said load receptor located in its position raised by the second motorized lifting device, raising the balance until the carrier arrangement extends through the group of openings, associated with the test weight, and the carrier arrangement abuts the test weight, further raising the balance together with the test weight, resting on the carrier arrangement of its load receptor, until the stop abuts a counter-stop, which is fixed at a fixed height relative to the balance, transferring the load receptor with the second motorized lifting device into its lowered position, determining a weight value for the test weight and lowering the balance into the changing position.

The person skilled in the art will understand that the load receptor has to be decoupled again from the weighing system at an appropriate time before going through the process again, i.e., has to be transferred back again into its raised position with the second lifting device at the proper time. However, the choice of the appropriate time is not relevant to the invention and can be made by those skilled in the art in accordance with the requirements of the actual individual case.

A device according to the invention is operated advantageously as a comparator. That means that the method explained above is carried out cyclically in the sequence listed above, where in this case each weight value that is determined for a test weight is compared with a weight value that is determined in an analogous manner for a reference weight. When weighing a large number of test weights, it is possible to weigh alternatingly a test weight and the reference weight. It is also just as possible to weigh the test weights sequentially and to compare with a weight value of the reference weight that is determined before and after weighing the test weights. Of course, all variants between these two extremes are also conceivable.

Other features and advantages of the invention will become apparent from the following specific description and the drawings.

DETAILED DESCRIPTION

Figure 1:
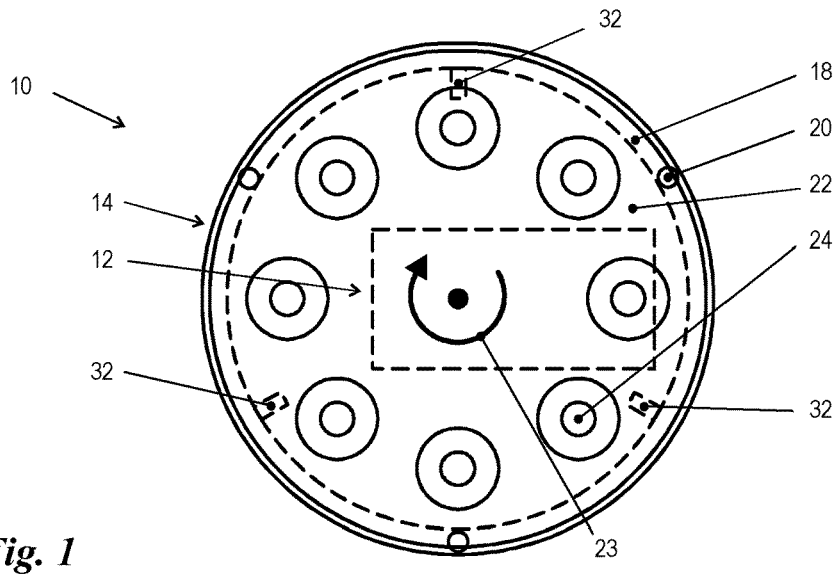
FIG. 1: in schematic form a plan view of a device according to the invention.

Identical reference numerals in the figures indicate the same or analogous elements.

Figure 2:
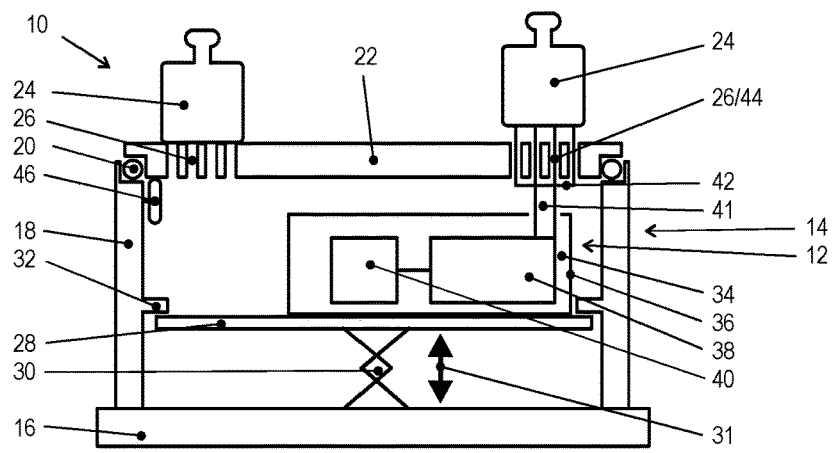
FIG. 2: a side view of the device from FIG. 2 in its weighing position.
Figure 3:
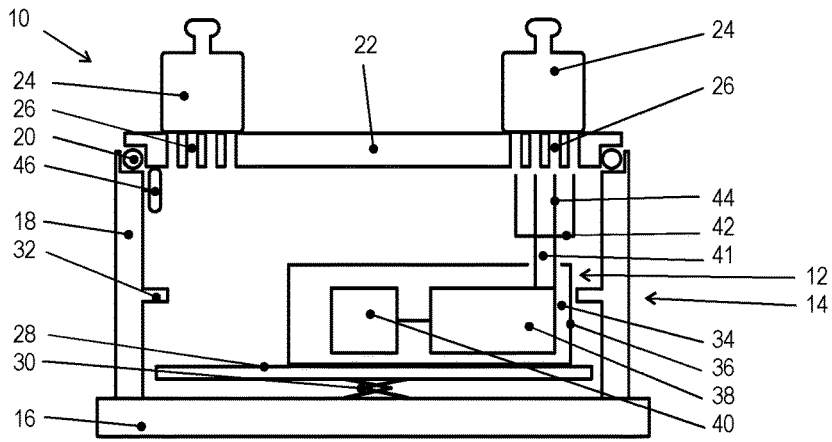
FIG. 3: a side view of the device from FIG. 1 in its changing position.

FIGS. 1 to 3, which will be discussed together in the following, show in a highly schematized representation an embodiment of an inventive device 10 comprising a balance 12 and a load changing unit 14.

A frame is fixed on a common base 16, and this frame can be designed, for example, as a linkage or housing. In the illustrated embodiment the frame is designed as a drum housing 18. At its upper edge the drum housing 18 supports a three point turntable bearing arrangement 20, on which a turntable 22 is rotatably mounted. The rotatability of the turntable 22 is indicated in FIG. 1 by the rotation arrow 23. The turntable 22 is used as a magazine for test weights 24, which are positioned on the turntable 22, uniformly distributed over its periphery at predetermined positions in the embodiment shown. The predetermined positions of the test weights 24 are distinguished, in particular, by groups of vertical openings 26 extending through the turntable 22. The openings can be designed, for example, in the shape of a gap or round hole. In the embodiment shown, each group of openings, associated with the test weights 24, consists of a plurality of vertical openings. However, embodiments, in which at least one of the groups of openings consists of only one sufficiently large vertical opening 26, are also conceivable. The importance of vertical openings 26 shall be discussed in greater detail below.

Below the turntable 22 there is arranged a lifting device 28, which is formed in the manner of a lifting platform with a scissor lift 30 in the embodiment shown. The lifting device 28 can be moved vertically, as indicated by the movement arrow 31 in FIG. 2, and in this case FIG. 2 shows a raised position, referred to herein as a weighing position, and FIG. 3 shows a lowered position, referred to herein as a changing position. On the inner wall of the drum housing 18 there is arranged a stop 32, against which the lifting device 28 in its weighing position abuts with a counter-stop that is not shown in detail. As a result, the weighing position of the lifting device is exactly defined by the stop 32.

The balance 12 is disposed on the lifting device 28. This balance comprises a load cell 34, which in the embodiment shown comprises a housing 36, inside of which a mechanical weighing system 38 and a corresponding electronic control unit 40 are arranged. The details of the weighing system and the electronic control unit, both of which operate preferably according to the principle of electromagnetic compensation, but may also be based on the strain gauge principle or any other weighing principle, are not shown in the figures and are also largely irrelevant for the present invention. The weighing system 38 is coupled through a load introducing element 41 to a load receptor 42, which is used to receive a load, for which a weight value is to be determined with the load cell 34. The load receptor 42 has a carrier arrangement 44, which is formed in the embodiment shown as a plurality of vertically oriented fingers having a size and position corresponding to the vertical openings 26 of each group of openings in the turntable 22. In other words, with the correct angular positioning of the turntable 22, the fingers of the carrier arrangement 44 can extend through the vertical openings 26.

This is the case for the weighing position of the lifting device 28, shown in FIG. 2. In this case the fingers of the carrier arrangement 44 project through the vertical openings 26 in the turntable 22 without making contact and lift the test weight 24 positioned thereon. Consequently the load of the raised test weight 24 rests on the load receptor 42 and is introduced into the weighing system 38 of the load cell 34, so that a corresponding weight value can be determined. In the changing position shown in FIG. 3, however, the carrier arrangement 44 is fully positioned below the vertical openings 26, so that the turntable 22 can rotate freely and can bring a different test weight 24 into position above the load receptor 42. In order to drive the turntable 22, a motorized peripheral drive, which is designed as a friction wheel drive, is provided in the embodiment shown. Such a peripheral drive has, compared to a centered drive, which, in principle, can also be applied, the advantage that a larger installation space is available for the load cell 34 and the lifting device 28 inside the drum housing 18.

Of course, the embodiments, which are discussed in the specific description and shown in the figures, represent only illustrative exemplary embodiments of the present invention. The person skilled in the art is offered a wide range of possible variations in the light of the disclosure herein. In particular, the inventive device, which is used preferably as a comparator, can be equipped with all of the details, known to the person skilled in the art and still to be developed in the future, regarding the weighing system 38, the electronic control unit 40, the lifting device 28, the turntable bearing arrangement 20, the centering of the test weights 24 on the turntable 22 or on the carrier arrangement 44.

LIST OF REFERENCE NUMERALS 10 device
12 balance
14 load changing device
16 base
18 drum housing
20 turntable bearing arrangement
22 turntable
23 rotation arrow
24 test weight
26 vertical opening in 22
28 lifting device
30 scissor lift
31 vertical movement arrow
32 stop
34 load cell
36 housing
38 weighing system
40 electronic control unit
41 load introducing element
42 load receptor
44 carrier arrangement
46 friction wheel drive

What is claimed is:

1. Balance device with a base, a stop and a load changing device,
wherein the load changing device comprises:
a magazine table, which is mounted to be horizontally movable and which has a plurality of vertical openings arranged into groups, and
wherein the balance comprises:
a load cell and a load receptor, which has a single carrier arrangement that corresponds to each and any of the groups of the openings in the magazine table,
wherein the magazine table and the balance are configured to adjust in height relative to each other, so that, in a weighing position, one of the groups of the openings that is positioned above the load receptor in the magazine table is penetrated by the carrier arrangement of the load receptor, and, in a changing position, the carrier arrangement of the load receptor is positioned lower than the group of the openings in the magazine table,
wherein the magazine table is mounted at a fixed height relative to the base, and the balance is configured to adjust in height relative to the base, and
wherein a travel distance of the balance is upwardly limited by the stop, which is positioned at a fixed height relative to the base.

2. Device, as claimed in claim 1,
wherein the magazine table is a turntable, which is mounted to rotate horizontally and has a surface area over which the groups of the openings are distributed.

3. Device, as claimed in claim 1,
wherein the magazine table is a sliding stage, which is mounted to move linearly and horizontally and has a surface area over which the groups of the openings are distributed.

4. Device, as claimed in claim 1,
wherein the stop, or a counter-stop that is fixed at a fixed height relative to the balance, comprises a force-measuring device.

5. Device, as claimed in claim 1, further comprising a motorized lifting device,
wherein the balance comprises or is disposed on the motorized lifting device.

6. Device, as claimed in claim 5,
wherein the motorized lifting device comprises a force-controlled cut-off.

7. Device, as claimed in claim 1,
wherein the magazine table comprises a motorized drive.

8. Device, as claimed in claim 1, further comprising a motorized load receptor lifting device,
wherein the load receptor is configured to adjust in height with respect to the load cell through operation of the motorized load receptor lifting device, and wherein the load receptor is decoupled from a weighing system of the load cell in a raised position and is coupled with the weighing system of the load cell in a lowered position.

9. Method for operating a balance with a load changing device,
wherein the load changing device comprises a magazine table, which is mounted to be horizontally movable and which has a plurality of vertical openings arranged into-groups,
wherein the balance comprises a load cell and a load receptor, which has a single carrier arrangement that corresponds to each and any of the groups of the openings in the magazine table, and
wherein, distributed over the magazine table, several test weights are positioned respectively over associated groups of the openings, said method comprising:
moving the magazine table until a selected test weight is positioned above the load receptor of the balance located in a changing position,
raising the balance until the carrier arrangement extends through the group of the openings associated with the test weight, and the carrier arrangement abuts the test weight,
further raising the balance together with the test weight that rests on the carrier arrangement of the load receptor, until a stop abuts a counter-stop that is fixed at a fixed height relative to the balance,
determining a weight value for the test weight, and
lowering the balance into the changing position.

10. Method for operating a balance with a load changing device,
wherein the load changing device comprises a magazine table, which is mounted to be horizontally movable and which has a plurality of vertical openings arranged into groups,
wherein the balance comprises a load cell and a load receptor, which has a single carrier arrangement that corresponds to each and any of the groups of the openings in the magazine table,
wherein, distributed over the magazine table, several test weights are positioned respectively over associated groups of the openings,
wherein the load receptor is configured to adjust in height with respect to the load cell through operation of a motorized load receptor lifting device, and
wherein the load receptor is decoupled from a weighing system of the load cell in a raised position and is coupled with the weighing system of the load cell in a lowered position, said method comprising:
moving the magazine table until a selected test weight is positioned above the load receptor of the balance located in a changing position, with the load receptor located in the raised position,
raising the balance until the carrier arrangement extends through the group of the openings associated with the test weight, and the carrier arrangement abuts the test weight,
further raising the balance together with the test weight that rests on the carrier arrangement of the load receptor, until a stop abuts a counter-stop that is fixed at a fixed height relative to the balance,
transferring the load receptor with the motorized load receptor lifting device into the lowered position,
determining a weight value for the test weight, and
lowering the balance into the changing position.

* * * * *